May 7, 1968 K. B. ARUTJUNOV ET AL 3,381,531

ORBITAL BALL FLOWMETER WITH BYPASS

Filed Aug. 3, 1965 2 Sheets-Sheet 1

United States Patent Office 3,381,531

Patented May 7, 1968

3,381,531

ORBITAL BALL FLOWMETER WITH BYPASS

Konstantin Bagratovich Arutjunov, Georgy Genrikhovich Iordan, Vilgeny Alexandrovich Rukhadze, Leonid Nikolaevich Shonin, Jury Alexandrovich Komarov, Igor Nikolaevich Ivanov, Jury Sergeevich Konoplev, and Mikhail Danilovich Silin, Moscow, U.S.S.R., assignors to Nauchno-Issledovatelsky Institut Teploenergetiches-kogo Priborostroenia, Moscow, U.S.S.R.

Filed Aug. 3, 1965, Ser. No. 476,822

5 Claims. (Cl. 73—202)

ABSTRACT OF THE DISCLOSURE

A flow rate meter transmitter in which a hollow non-magnetic body is connected to a pipeline for the passage of fluid, the body containing a by-pass sleeve with a through channel, an annular gap being formed between the outer surface of the sleeve and the inner surface of the body accommodating a guide member which imparts vortex motion to the fluid stream in the gap which carries a freely floating ball of ferromagnetic material along a confined path on the internal surface of the body for activating a device to produce signals related to the flow rate of the fluid stream.

This invention relates to devices for measuring fluid flow and more particularly to transmitters of flow-rate meters intended for measuring the instantaneous flow rate of liquid or gaseous media or determining the total flow of materials passing through pipelines of manufacturing plants.

Known in the art are transmitters of flow-rate meters comprised of a turbine mounted in bearings. Said transmitters suffer from the drawback of being excessively sensitive to vibrations and impact loads; another disadvantage is that abrasive particles, if present in the fluid being measured, rapidly damage the turbine.

Attempts have been made to eliminate said drawbacks by employing flow transmitters, in which a freely-floating ball made of a ferromagnetic material is contained in the fluid stream being controlled. A fixed guiding device imparts vortex motion to the fluid stream, and the speed of rotation of the ball which is proportional to the flow rate of the stream, is recorded by a contactless magnetic arrangement located outside the non-magnetic housing of the transmitter.

Said transmitters are, however, incapable of measuring the flow rate and total flow of the fluid when the direction of fluid flow in pipelines in reversed.

Moreover, the transmitters described hereinabove have a very narrow measurement range and demonstrate inadequate reliability in service due to the wear of the freely-floating ball and also because of the tendency displayed by the ball to become immobilized upon contact with adjacent structural elements.

Accordingly, it is an object of the present invention to provide a transmitter for flow-rate meters which is capable of measuring the instantaneous flow rate and total flow of fluids passing in both directions, thereby making possible the simplification of manufacturing plants due to the use of one and the same pipeline for both feeding and discharging the materials.

Another object of the invention is to extend the measurement range of transmitters for flow-rate meters.

A further object of this invention is to provide a transmitter for flow-rate meters which combines longer service life and dependable performance, thereby making the transmitter suitable for use in closed structures, where the adjustment and repair of the transmitter cannot be regularly effected due to the lack of free access to the transmitter.

Accordingly, the main object of the present invention is to provide a transmitter for flow-rate meters in which arrangements for altering the nature of the flow of the fluid stream being controlled are located in such a way that the fluid stream may be measured when flowing either in the forward or the backward direction, an added feature being that said arrangements are protected from interaction with the freely-floating ball in order to prevent the wear of said ball.

These objects have been accomplished by the transmitter of the present invention, in which the transmitter body communicates with the pipe line and houses a by-pass sleeve, provision being made of an annular gap between the external surface of the sleeve and the internal surface of the transmitter body, said gap incorporating a free ball and the following elements, mounted at least on one side of said ball in the order specified hereinfater: means for imparting linear motion to the part of the fluid stream entering the gap which is located at the ends for the transmitter body; means of imparting vortex motion to the fluid stream in the middle portion of the annular gap, and a limiting device to prevent the ball from undergoing lateral displacement.

To control the ratio of the fluid streams directed through the by-pass sleeve and the annular gap, recourse is had to changeable nozzles mounted at the ends of said by-pass sleeve. This arrangement is instrumental in extending the range within which the transmitter measures the fluid flow.

The invention is illustrated hereinafter in the description and accompanying drawings, wherein.

Figure 1:
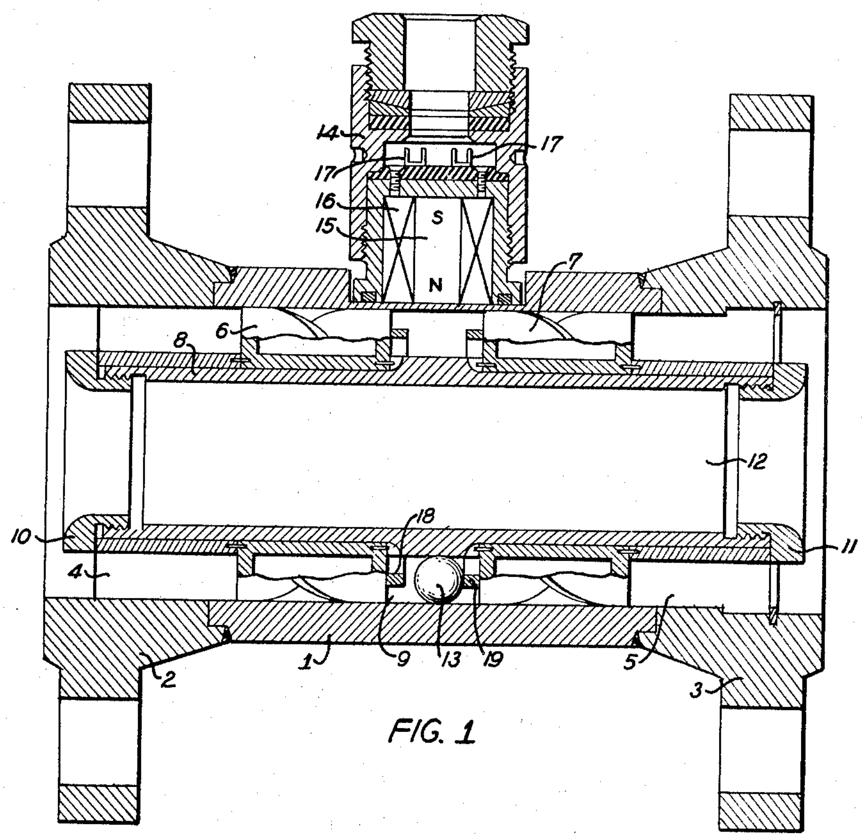
FIG. 1 is a sectional view of a first embodiment of the flow-rate transmitter according to the invention.

The transmitter of the flow-rate meter (FIG. 1) consists of a hollow non-magnetic body 1 made of a tube length with flanges 2 and 3 welded to the tube ends; the flanges are intended for fastening the transmitter body coaxially with the pipeline conveying the fluid stream being controlled.

Rigidly mounted in the measuring chamber of transmitter body 1 is an assembly comprised of two groups of straight plates 4, 5, which are placed parallel to the axis of the body and are intended for imparting linear motion to the controlled fluid stream passing through the transmitter body, and two groups of curved guiding elements 6, 7, which impart vortex motion to the controlled fluid stream.

Groups 4, 5, 6 and 7 are centered in relation to one another by a by-pass sleeve 8, annular gap 9 being provided between the external surface thereof and the internal surface of body 1.

Screwed onto the ends of the sleeve 8 are changeable nozzles 10 and 11, which simultaneously act as nuts for fastening groups 4, 5, 6, and 7 to sleeve 8.

The fluid stream being controlled enters body 1 of the transmitter and breaks into two parts, so that one part passes through annular gap 9, which constitutes the measureing chamber of the transmitter, while the other part of the stream flows freely through channel 12 of sleeve 8.

Upon entering annular gap 9, the fluid stream is first stabilized by plates of groups 4 and 5, and then the curved guiding elements of groups 6 and 7 impart a vortex motion to the fluid stream.

The vortical stream of the fluid being controlled entrains free ball 13 made of a ferromagnetic material so that the ball is caused to roll along the curvilinear, e.g., cylindrical, surface of transmitter body 1.

The rotational speed of ball 13 is registered by signal pick-up unit 14, which consists of permanent magnet 15 and induction coil 16. Measuring pulses induced in coil 16 when ball 13 traverses the field of magnet 15 are sent to output terminals 17; the signals characterize the instantaneous flow rate of the fluid stream being controlled.

To prevent ball 13 from lateral displacement with resultant wear and jamming, the opposed ends of curved guiding elements of groups 6 and 7 are furnished with guide rings 18 and 19.

The location of groups 4, 5, 6 and 7 as well as of guide rings on both sides of the plane in which ball 13 is caused to rotate makes it possible to control the fluid flow rate when the stream is reversed.

An added advantage of the transmitter is that by replacing nozzles 10 and 11, having a definite area of openings, with nozzles of another opening area the ratio of the two parts of the fluid stream can be varied since the ratio of the stream passing through annular gap 9 and that directed through channel 12 of sleeve 8 is inversely proportional to the ratio of flow resistance in gap 9 and channel 12.

This causes a simultaneous variation in the total flow being registered by the transmitter, which fact increases the measurement range of the flow rate meter and makes the transmitters completely interchangeable in respect of secondary instruments.

Figure 2:
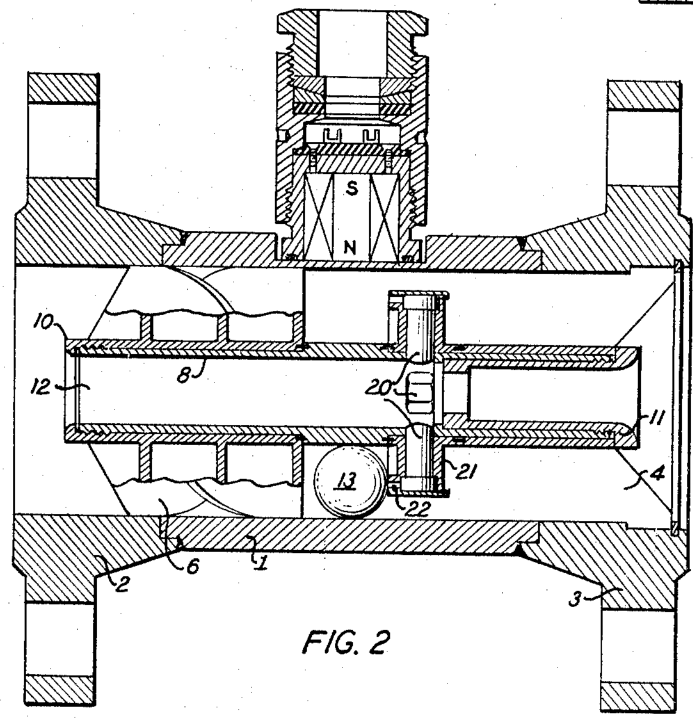
FIG. 2 is a sectional view of a modified embodiment of the flow-rate transmitter.

The transmitter of a flow-rate meter shown in FIG. 2 is identical with the transmitter presented in FIG. 1, but is designed for measuring the flow of a stream moving in one direction.

Said transmitter is characterized in that a part of the fluid stream being measured, which passes through channel 12 of sleeve 8, is directed via branch channels 20 in disc-type distributor 21 to annular slit nozzle 22. A part of the stream issuing from nozzle 22 deflects rotation ball 13 thereby preventing the lateral motion of the ball in the direction of the axis of body 1.

The employment of said transmitter for measuring reversible streams necessitates the installation of two symmetrically located disc-type distributors and other elements.

Figure 3:
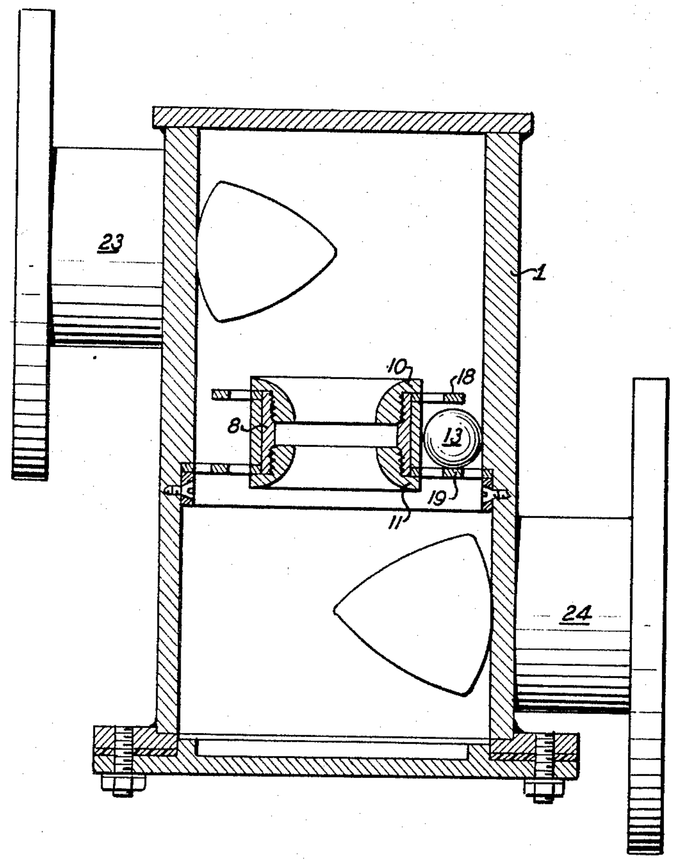
FIG. 3 is a view partly in section of a further embodiment of the flow-rate transmitter.

In the transmitter shown in FIG. 3 provision has been made of by-pass sleeve 8 with changeable nozzles 10 and 11, and guide rings 18 and 19, vortex motion being imparted to the controlled fluid stream due to inlet and outlet pipes 23 and 24 located tangentially with respect to the cylindrical surface of body 1 of the transmitter.

What we claim is:

1. A transmitter of flow-rate meters for measuring fluid flow in both directions in a pipeline, comprising a hollow non-magnetic body having opposit ends and a curvilinear internal surface; means for mounting said body coaxially with said pipeline; a by-pass sleeve mounted within said body, said by-pass sleeve having an external surface defining an annular gap with the internal surface of said body, said by-pass sleeve having opposite ends and a through channel for the passage of fluid; changeable nozzles mounted at the ends of said sleeve in said channel for varying the ratio of streams of fluid flow in the channel and said anular gap; means for imparting linear motion to the fluid stream that enters said annular gap, said means being located in the gap at the ends of said body; first and second guiding means for imparting vortex motion to the fluid stream that passes through said annular gap, said first and second guiding means being located in spaced relation from each other in said gap in the central portion of said body; a freely-floating ball of ferromagnetic material located between said first and second guiding means and capable of being entrained by the vortex motion of the stream in said gap along the internal surface of said body; a limiting device for preventing said ball from undergoing lateral displacement in the downstream direction; and means mounted outside said body and capable of responding to the motion of said ferromagnetic ball to produce measuring signals related to the flow rate of the fluid flow being measured.

2. A transmitter of flow-rate meters for measuring fluid flow in both directions in a pipeline comprising a hollow non-magnetic body having opposite ends and a cylindrical internal surface; flanges at the ends of said body for mounting the body coaxially with said pipeline; a by-pass sleeve mounted within said body, said by-pass sleeve having an external surface defining an annular gap with the internal surface of said body, said by-pass sleeve having opposite ends and a through channel for the passage of fluid; changeable nozzles mounted at the ends of said sleeve in said channel for varying the ratio of streams of fluid flow entering the channel and said annular gap; two groups of straight plates placed in said annular gap parallel to the axis of said body, said plates being located at the ends of said body and serving to impart linear motion to the fluid stream that enters said gap; two groups of curved guiding elements for imparting vortex motion to the fluid stream, said groups of curved guiding elements being located in said annular gap in the central portion of said body in spaced relation from each other; a freely-floating ball of ferromagnetic material located between said groups of guiding elements in said annular gap and capable of being entrained by the vortex stream along the internal surface of said body; a limiting device for preventing said ball from undergoing lateral displacement in the downstream direction; and a permanent magnet with an induction coil monuted outside said body and capable of responding to the motion of said ferromagnetic ball so that measuring signals are generated, which are related to the flow rate of the fluid flow being measured.

3. A transmitter of flow-rate meters for measuring fluid flow in a pipeline in both directions, comprising a hollow non-magnetic body having oppoiste ends and a cylindrical internal surface; flanges at the ends of said body for mounting the body coaxially with said pipeline; a by-pass sleeve mounted within said body, said by-pass sleeve having an external surface defining an annular gap with the internal surface of said body, said by-pass sleeve having opposite ends and a through channel for the passage of fluid; changeable nozzles mounted at the ends of said sleeve in said channel; two groups of straight plates located at the inlet end and the outlet end of said annular gap and extending parallel to the axis of said body; two groups of curved guiding elements located in spaced relation from each other in the central portion of said annular gap for imparting vortex motion to the fluid stream in said annular gap; a freely-floating ball of ferromagnetic material located between said groups of guiding elements in the annular gap and capable of being entrained by the vortex motion of the fluid stream along the internal surface of said body; guide rings located on opposite sides of said freely-floating ball, said rings being affixed to adjacent facing ends of said guiding element groups; a permanent magnet with an induction coil mounted outside said body and capable of responding to the motion of said freely-floating ferromagnetic ball.

4. A transmitter of flow-rate meters for measuring fluid flow in a pipeline, comprising a hollow non-magnetic body having opposite ends and a cylindrical internal surface; flanges at the ends of said body for mounting the body coaxially with said pipeline; a by-pass sleeve mounted within said body, said bypass sleeve having an external surface defining an annular gap with the internal surface of said body, said by-pass sleeve having opposite ends and a through channel for the passage of fluid; changeable nozzles mounted at the ends of the sleeve in said channel, said nozzles having different opening areas; at least one group of straight plates located in said annular gap parallel to the axis of said body at the outlet of the fluid stream being controlled; at least one group of curved guiding elements located in said annular gap at the inlet of the fluid stream being controlled for imparting vortex motion to the fluid stream passing through said annular gap; a freely-floating ball of ferromagnetic material located between said straight plates and guiding elements in said annular gap and capable of being entrained by the vortex motion of the fluid stream along the internal surface of said body; at least one annular slit nozzle communicating with the through channel in said sleeve and facing said free-floating ball to prevent its lateral displacement in the down stream direction of fluid flow; and a permanent magnet with an induction coil mounted outside said body and capable of responding to the motion of said freely-floating ferromagnetic ball.

5. A transmitter of flow-rate meters for measuring fluid flow in a pipeline, comprising a hollow non-magnetic body having opposite ends and a cylindrical internal surface; inlet and outlet connecting branches located tangentially in relation to the internal cylindrical surface of said body for the introduction and discharge of a fluid stream from said body for imparting vortex motion to said stream as it traverses said body; said connecting branches being spaced apart along said body and having flanges at the ends thereof adapted for mounting said connecting branches to said pipeline; a by-pass sleeve in said body between said inlet and outlet connecting branches, said by-pass sleeve having an external surface defining an annular gap with the internal surface of said body, said by-pass sleeve having opposite ends and a through channel for the passage of fluid; changeable nozzles mounted at the ends of said sleeve, said nozzle having different opening areas; two annular guide elements located in said annular gap in spaced relation from each other for imparting vortex motion to the fluid stream passing through said annular gap; a freely-floating ball of ferromagnetic material located between said annular guide elements and capable of being entrained by the vortex motion of the fluid stream along the internal surface of said body; and a signal pick-up device mounted outside said body and capable of responding to the motion of said freely-floating ferromagnetic ball.

References Cited

UNITED STATES PATENTS

| | | | |
|---|---|---|---|
| 2,293,478 | 8/1942 | Stevenson | 73—203 |
| 2,518,149 | 8/1950 | Kearsley | 73—194 |

FOREIGN PATENTS

| | | |
|---|---|---|
| 352,925 | 7/1931 | Great Britain. |

RICHARD C. QUEISSER, *Primary Examiner.*

JAMES J. GILL, *Examiner.*

E. GILHOOLY, *Assistant Examiner.*